(Model.)

F. GUNDORPH.
FISH LINE REEL.

No. 364,509.　　　　　　　　　Patented June 7, 1887.

Attest.
Hamilton Platt
Chas. B. Talbot.

Inventor,
Ferdinand Gundorph

UNITED STATES PATENT OFFICE.

FERDINAND GUNDORPH, OF PORTLAND, OREGON.

FISH-LINE REEL.

SPECIFICATION forming part of Letters Patent No. 364,509, dated June 7, 1887.

Application filed August 7, 1886. Serial No. 210,364. (Model.)

*To all whom it may concern:*

Be it known that I, FERDINAND GUNDORPH, a citizen of the United States, and a resident of the city of Portland, county of Multnomah, and State of Oregon, have invented an Improved Fish-Reel, of which the following is a description and specification.

The nature or object of this invention is to make a cheap and convenient form of reel embodying requisities found only in more expensive and well-constructed reels, which is more fully shown by the drawings.

Figure 1:
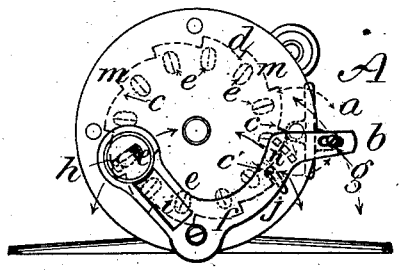
Figure 2:
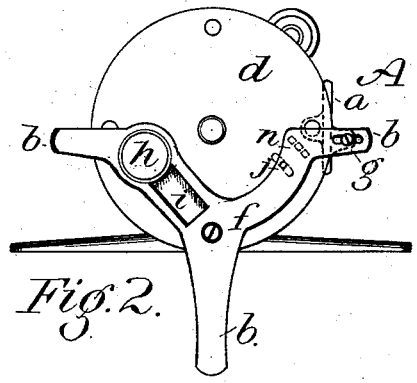
Figure 3:
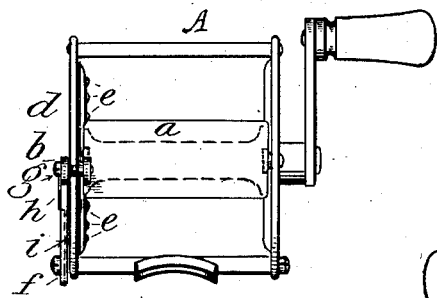
Figures 4, 5:
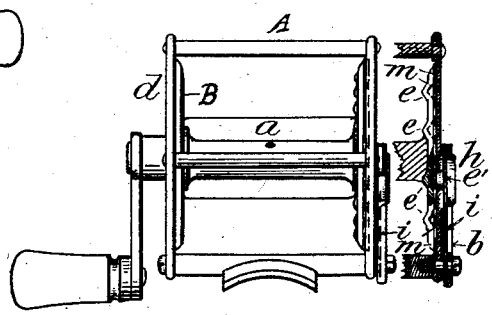
Figures 6, 7:
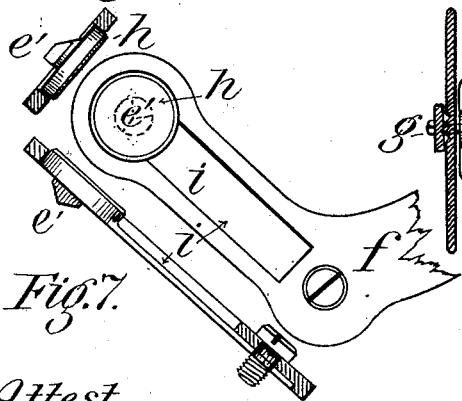
Figure 8:
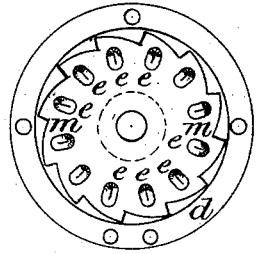

Figure 1 shows an end view of the reel as commonly made. Fig. 2 shows a modification of the same, whereby it is adapted to be hung on the under side of the rod or reversed. Fig. 3 is a front view from the butt of the rod, and Fig. 4 a back view, or a view from the top of the rod. Fig. 5 is a section showing the parts on the same side of the center of the reel. Fig. 6 shows the catch for securing the movable end of the thumb-lever, and Fig. 7 the opposite end of the thumb lever enlarged to show the spring and parts with sections of the end and side. Fig. 8 is the end of spool.

A is the frame of the reel such as are commonly made; B, the spool such as are in common use, only that one of the outer edges is made into a ratchet on the spool-body, instead of being an independent or separate piece such as many reels have. Secured to one side of the frame is the lever $f$, having a fulcrum in a central position, with spring $i$ in one end and a pin, $e'$, on said spring, and at the opposite end the pin $c'$, said pins $e'$ and $c'$ being carried or supported by the lever $f$, and by a suitable movement of this lever are made to engage with the spool end or ratchet, as hereinafter described; or, in another case, may not in any wise interfere with the movements of said spool when turned in either direction, whether the spool be a geared or multiplying one or simple or crank spool without gears. The thumb-plate $a$ is hung on one of the reel-frame studs by small ears bent at right angles to its face or flat portion, and of such a length that they may move freely between frame-casings and around the stud, the stud forming a center upon which this plate is centered or hung by its ears. To one of the corners of the thumb-plate a connection is made with one of the ends of the lever $f$ by means of a screw or pin, $g$, working in a slot in the end of the lever, whereby the lever is operated as hereinafter described; or said lever may be moved without the action of the thumb-plate in the ways shown by arms or elongations of it independently. Into the end of the lever $f$, opposite the thumb-plate $a$, a spring, $i$, provided with conical pin $e'$, is affixed, adapted to fit corresponding holes or depressions in the end of the spool, or restrained from entering the holes in the spool by being supported by some portion of the reel-case A, as hereinafter described.

By placing the thumb on the flat plate $a$, hung on one of the studs of the reel A, the thumb-lever $f$ may be operated in one of three ways, and the line is thereby controlled by the thumb at will. Three small notches, $n$, are formed in the side of the reel-frame $d$, into which a double-faced pin of a wedge shape fits whenever the lever $f$ is at rest, and can only be displaced by the action of the thumb.

The required positions are these: First position, where the reel is locked or cannot run; second, where the reel can run and wherein it becomes a "click-reel." (Shown in Fig. 1.) In this position the conical pin $e'$, fitting into corresponding holes, $e$, makes a noise through the action of the spring $i$ when the line runs out. In the third position the reel is entirely loose and may run freely without any hinderance.

In the first position a pin, $c'$, secured on the under side of the lever $f$, (near $b$, Fig. 1,) which works freely in a slot, $j$, in the side of the plate $d$, engages with the inner or bottom portion, $c$, of the ratchet $m$, which is one of the ends of the "reel-spool," and when in this locked position is in the place shown at $c'$, Fig. 1. In the second position the pin $c'$ is still in range of the ratchet, and by pressing the plate $a$ may be made to hold the line from running out, and in the third position the pin $c'$ is entirely clear of the ratchet and the "click" ($e'$ and spring $i$) has been thrown out of gear. The last action of $e'$ is somewhat similar to the action of a spring-latch, one of its sides being beveled off, and as the lever moves engages with the beveled side of the slot in the piece $d$. This shape is shown in the upper or end section for Fig. 7. The holes $e$, into which $e'$ falls, are shallow and conical, and the line while in the second or click position may be wound up or allowed to run, as desired, only that it will make a noise.

To assist in stopping the line, or having another way to do so, the button $h$ is attached to the spring $i$, to be used as required by pressing it and so holding the line in addition to the first method.

When the reel is hung on the under side of the rod, the plate $a\,a$ will be opposite to the thumb, and it becomes necessary to have other means of operating the lever $f$, so an elongation from the center is made (shown in Fig. 2) at the bottom and left-hand side, there being three points, $b$, whereby it may be moved independently from the lever or plate $a$ and its connections.

The use of the plate $a$ may be dispensed with and the lever $f$ moved only by the ends $b$ in the positions, as required, and in this manner the structure cheapened to some degree. The plate $a$ has a center on the opposite sides of the reel moving freely on the front stud of the same, the centers being formed by two ears turned inwardly. There is also a similar ear on the outside, into which a screw or pin, $g$, is screwed or fixed, which moves freely in a slot in the end of the lever $f$. (Seen on the right hand at $b$ in Figs. 1 and 2.) When the reel is in the locked position, Fig. 1, it will unlock by turning the reel backward by the crank without the thumb or finger pressing against the plate $a$ or lever $f$ through one of the points $b$. The elongated or wedge-shaped depressions shown in the end of the spool, Fig. 8, are formed by a milling-tool of a conical form, and moved laterally while boring. These depressions are made in this elongated manner to allow the free motion of the lever $f$ while being moved in some one of the three positions before described.

In my construction I have a crank, spool, and frame, the same as in the common or old construction; but in my spool I add the ratchet $m$ on one of the spool edges, and on the same end of the spool are holes or depressions $e$, the ratchet $m$ being placed thereon for stopping the spool, and $e$ for the purpose of making a noise in combination with the spring $i$. The device is put in use by the thumb-plate $a$, or some portion of lever $f$ and its elongations, whereby it is made to assume one of the three positions, first, a "stop;" second, a click or noise; third, a noiseless loose or running position applied at will by the user through the action of the thumb-plate $a$ or lever $f$ or its parts in connection with the spool edge or end in the manner described, to a common crank and spool-reel, having these previously-described additions. The same mechanism may be applied to a multiplying or geared reel, and in the same manner, by making the additions and changes required, as before stated or described for a common crank-reel. I do not claim in any manner the construction of a common reel, but the combination or application to the same of the lever $f$ and its spring $i$ and pin $c'$, (the first for making a noise, and the latter for locking it,) and in addition the moving of the lever $f$ in such a manner that neither the spring $i$ nor pin $c'$ may touch the spool or reel when it becomes noiseless, and a simple crank, or a common multiplying-reel, as the case may be, when made and used substantially as described.

I am aware that there are numerous ways of making a click-reel and of gearing and ungearing them by means of a spring and cog or ratchet wheel, and in every case the cog or ratchet is an independent piece secured to some part of the reel frame or spool, or both, as the case may be; but I do not know of any click applied to the end or edges of the spool itself, or a "drag" or stop by means of a lever carrying the same, whereby they or either of them are placed in a position for use or are thrown out of use or disconnected from the spool by means of a lever carrying or moving such devices independent of the reel-frame. Another peculiarity is the manner in which the lever is set or held in one or another of three positions, as hereinbefore described.

What I claim as my invention, and desire to protect by Letters Patent, is—

1. The combination, with the spool provided at one face end with a plurality of depressions, of a lever pivoted to said spool, and a spring engaging said depressions, substantially as and for the purpose specified.

2. The combination, with the spool provided with depressions $e$ and ratchet $m$, of a lever pivoted to said spool, a spring engaging said depressions, and a pin, $c'$, on said lever, on the opposite side of its pivot from the spring, and constructed to engage said ratchet, substantially as and for the purposes specified.

3. The combination, with the spool and ratchet $m$, of the lever $f$, pivoted to said spool, the pin $c'$ on said lever in proximity to the thumb-plate, and engaging said ratchet and the thumb-plate $a$, pivoted to the spool and connected with the lever, substantially as and for the purpose specified.

4. The combination, with the spool, ratchet, and lever pivoted to said spool and provided with a slot in one of its arms, of the pin $c'$ on the slotted arm of said lever and engaging said ratchet, and the thumb-plate $a$, pivoted to said spool and provided with pin $g$, engaging said slot, substantially as and for the purposes specified.

5. The combination, with the spool provided with slot $j$, depressions $e$, and ratchet $m$, of the lever $f$, pivoted to said spool and provided with pin $c'$, engaging said ratchet, spring $i$, having pin $e'$, engaging said depressions, thumb-plate $a$, pivoted to said spool, and the pin $g$ on said plate engaging a slot in one arm of said lever, all substantially as described.

FERDINAND GUNDORPH.

In presence of—
HAMILTON PLATT,
CHAS. B. TALBOTT.